Feb. 16, 1965 W. P. SPALDING 3,169,391
PNEUMATIC POWER ACTUATED CLAMPING APPARATUS
Filed Dec. 20, 1961 2 Sheets-Sheet 1
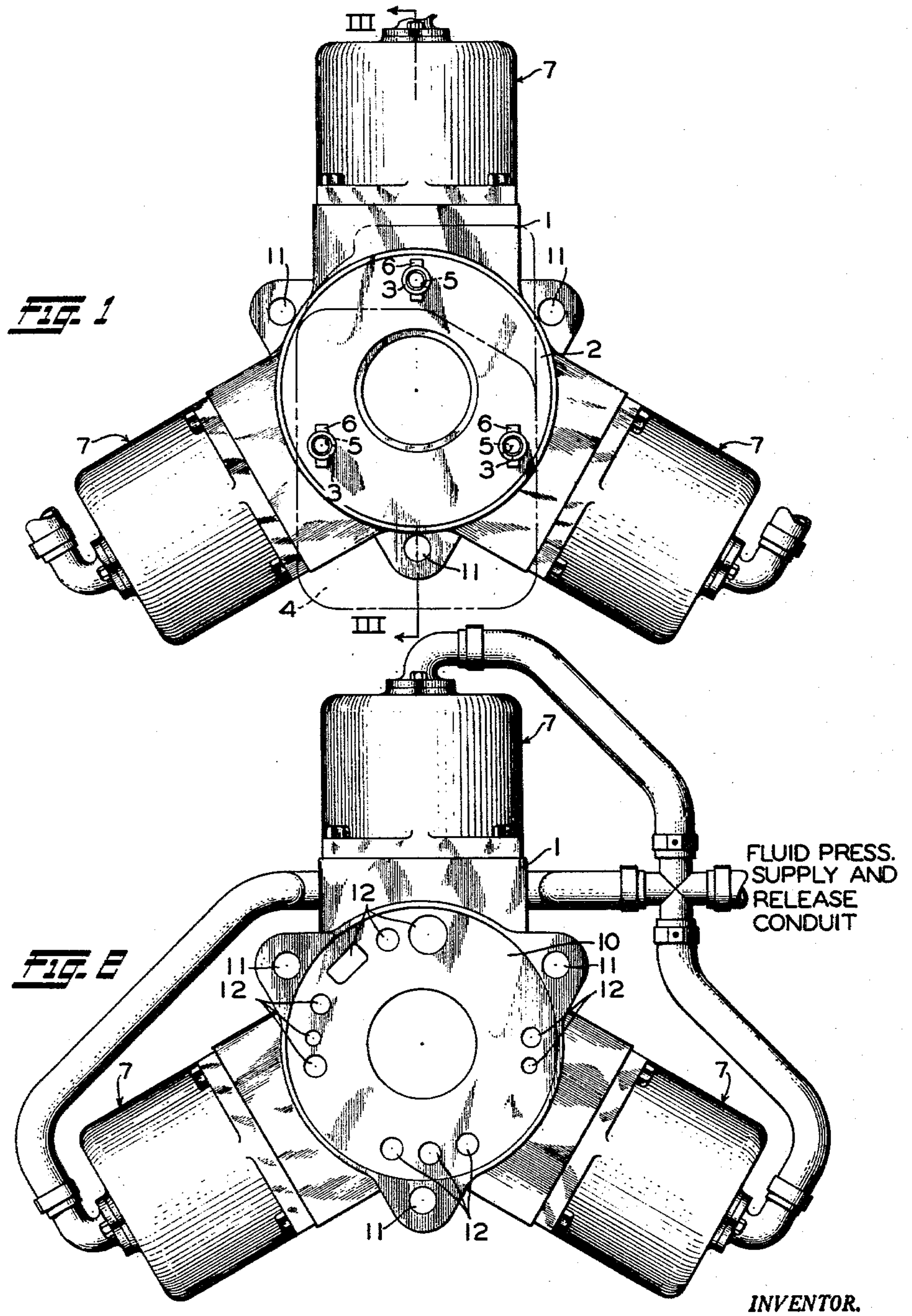
INVENTOR.
Willard P. Spalding
BY
A. A. Steinmiller
Attorney

PNEUMATIC POWER ACTUATED CLAMPING APPARATUS

Filed Dec. 20, 1961 2 Sheets-Sheet 2

*INVENTOR.*
*Willard P. Spalding*
BY *A. A. Steinmiller*
*Attorney*

United States Patent Office 3,169,391

Patented Feb. 16, 1965

3,169,391

PNEUMATIC POWER ACTUATED CLAMPING APPARATUS

Willard P. Spalding, Pittsburgh, Pa., assignor to Westinghouse Air Brake Company, Wilmerding, Pa., a corporation of Pennsylvania Filed Dec. 20, 1961, Ser. No. 160,833
7 Claims. (Cl. 73—39)

This invention relates to pneumatic power actuated clamping apparatus and, more specifically, to a new and improved clamping apparatus of the above-named type for clamping a valve device, such as a brake control valve device as used on railway vehicles, to a testing apparatus for checking the various operational functions of said valve device and thereby determining whether or not it is in proper operating condition for service on the vehicle.

In order to assure that railway braking equipment, particularly the valve devices associated therewith, will function properly once installed on the vehicles, it has become the practice to run operational tests on various valve devices, both new and repaired, before placing them in service. These tests may be performed on a test rack on which the valve device to be tested is secured, after which the operator, through use of a control panel, causes the valve device to perform, under simulated service conditions, the various functions for which it is designed. A signal panel indicates, as each function is registered, whether the device is functioning properly or not. If not, the particular defect is noted and can then be corrected.

Desirable characteristics of a test rack of the type above described would be a minimum amount of time required for testing each device and safety to the operator when operating the test rack. Much time can be saved if an excessive amount of time and energy is not required by the operator in securing the devices to be tested on the test rack, such as by threaded studs and nuts, after having placed them thereon.

Accordingly, the object of the present invention is to provide a power operated clamping apparatus for use with a test rack, whereby the device to be tested is merely placed on receiving studs and automatically and instantly secured to the test rack by fluid pressure operable clamping means controlled by the operator. Thus, a minimum of time and physical effort is required of the operator who may commence the testing procedure instantly.

Briefly, the invention comprises a plurality of receiving studs appropriately spaced to conform to the spacing of mounting holes formed on the device to be tested, said studs extending perpendicularly from a clamping face formed on the apparatus and against which the clamping face of the device to be tested is clamped in an air-tight position. The clamping apparatus is provided with a plurality of passageways each terminating at one end as ports opening to the clamping face of the apparatus, said ports being spaced to conform to the spacing of those on the clamping face of the device to be tested via which fluid under pressure may be supplied and released for testing purposes. The other ends of the respective passageways are connected to a pipe bracket via which the fluid under pressure is supplied. Each receiving stud has a latching mechanism associated therewith which is operated by a respective fluid pressure operable power cylinder to a latching position in which clamping pressure is applied to the device to be tested for sealing the clamping face of the device against the clamping face of the apparatus. The respective power cylinder devices for the receiving studs are radially disposed in a housing for the apparatus.

The invention is illustrated in greater detail in the accompanying drawing wherein:

FIG. 1 is an elevational view, in outline, of the clamping apparatus looking directly toward the clamping face against which the device to be tested is clamped;

FIG. 2 is a rear view of the device as shown in FIG. 1;

*Description and operation*

Figures 3, 4:
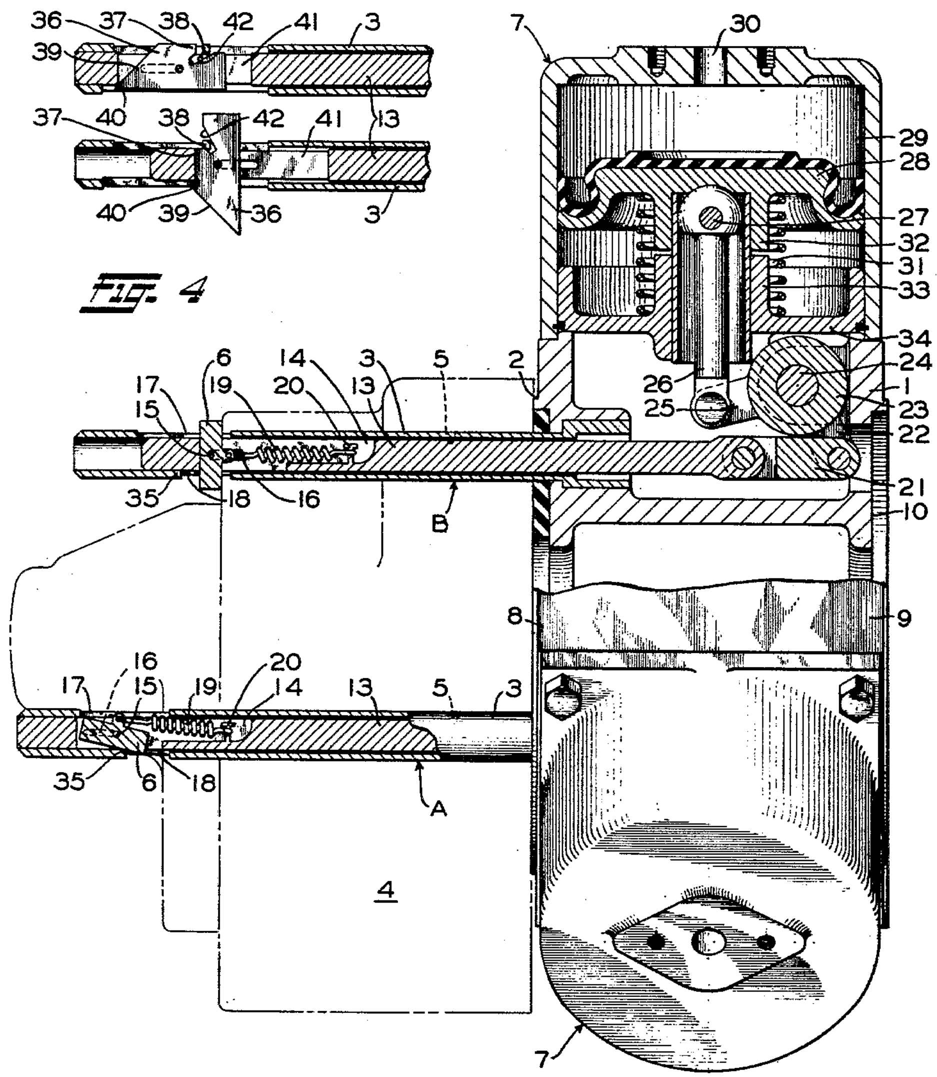
FIG. 3 is an elevational view, partly in section, taken along line III—III of FIG. 1 in the direction indicated by the arrows.
FIG. 4 is a modified version, shown in different positions, of a latching mechanism forming a part of the apparatus shown in FIG. 3.

As shown in FIG. 1, the clamping apparatus embodying the invention comprises a housing 1 having a front clamping face 2 from which a plurality of receiving studs 3 extend perpendicularly for receiving a valve device 4 to be tested, represented in phantom form by a broken outline in the drawing. Since the valve device 4 represents any form of valve device to be tested and does not constitute a part of the invention, no particular identification or description thereof is deemed essential. The receiving studs 3 are merely spaced on the front clamping face 2 to conform to the spacing of mounting drill holes 5 provided on any device, such as the valve device 4, capable of being tested on the test rack (not shown) with which the invention is intended to be used.

The receiving studs 3 are each provided with respective latch members 6 which, when operated to a latching position by respective power cylinder devices 7, in a manner to be more fully explained hereinafter, apply clamping pressure to the valve device 4 to hold a clamping face 8 (see FIG. 3) formed on said valve device against the front clamping face 2 of the clamping apparatus. When the valve device 4 is in service on the vehicle, the clamping face 8 is adapted to seat against a clamping face formed on a pipe bracket (not shown) constituting part of the brake equipment (not shown) of the vehicle. The power cylinder devices 7 are radially disposed in the housing 1 in an equiangularly spaced relationship to each other about a central housing portion 9 in which a plurality of passageways (not shown) are formed to provide pressure fluid communications from a rear clamping face 10 to the front clamping face 2.

The clamping apparatus is provided with a plurality of drill holes 11 by which it may be mounted on the test rack with the rear clamping face 10 making sealing contact with a clamping face of a pipe bracket (not shown) forming a component of said test rack. Fluid under pressure is supplied to the pipe bracket from which it may flow through a series of ports 12 opening to the rear clamping face 10 and connecting respectively to the passageways (not shown) formed in the central portion 9 of the housing. These passageways connect to respective ports (not shown) opening on the front clamping face 2 and registering with corresponding ports (not shown) in the valve device 4.

Since each of the receiving studs 3, as well as the respective latching mechanisms and power cylinder devices 7 associated therewith, are similar in structure, only one of said studs, latching mechanisms and power cylinder devices will be described in detail.

Each of the receiving studs 3 comprises a hollow tube in which a pull rod 13 is coaxially operable, said pull rod having formed therein, in the end adjacent the free end of said receiving stud, a transverse slot or recess 14 in which the latch 6 is operably disposed. The latch 6 has a pin 15 extending therethrough in perpendicular relation to the axis of the stud 3 and to the recess 14, said pin having its ends protruding into respective longitudinal guide slots 16 formed in the pull rod 13 in the facing side walls of said recess parallel to the axis of said rod, whereby said latch is capable of limited, axially directed lost motion relative to said pull rod and is also pivotable about the axis of the pin. The hollow receiving stud 3 is provided with longitudinal access slots 17 and 18 on opposite sides thereof registering with recess 14 to permit the extremities of latch member 6 to pivot outside the circumferential limits of said receiving stud, as will hereinafter be explained. A spring 19 has one end fastened to the center point of the side of latch member 6 facing toward the housing 1 and radially spaced from the axis of pin 15 about which latch member 6 pivots, and the other end fastened to a pin 20 fixed at the end of recess 14 toward said housing, said spring thereby serving to exert a pivoting moment on and effect a pivoting action of said latch member when the pull rod 13 is moved inwardly into housing 1.

The end of pull rod 13 opposite the end carrying the latch member 6 extends into housing 1 where it is pivotally connected to one end of a relatively short floating link 21, the other end of said link being pivotally connected to the end of one arm 22 of a bell crank lever 23 which is pivotable about a pin 24 fixed in the housing 1. The end of another arm 25 of the bell crank 23 is pivotally connected to one end of a connecting rod 26, the other end of said connecting rod being pivotally connected by a wrist pin 27 to a piston 28. The piston 28 is subjectable on one side thereof to pressure of fluid in a chamber 29 having a port 30 opening thereto and via which pressurized fluid may be supplied to and withdrawn from said chamber by operator controlled means (not shown). A spring 31 serves to bias the piston 28 in an upward direction, as viewed in the drawing, in opposition to the downwardly exerted force acting on said piston when chamber 29 is charged with pressurized fluid.

In operation, as above noted, the clamping apparatus embodying the invention is mounted to the test rack with the rear clamping face 10 sealed against the clamping face of the pipe bracket (not shown) of said test rack. The valve device 4 to be tested is placed on the receiving studs 3, at which time the chambers 29 of the respective power cylinder device 7 are at atmospheric pressure and all the latch members 6 are in fully retracted positions in the respective recesses 14, as shown in the receiving stud 3 designated A in FIG. 3 of the drawing, so that said valve device will slide on said receiving studs without hindrance.

When the clamping face 8 of the valve device 4 is in contact with the clamping face 2 of the clamping apparatus, the operator causes pressurized fluid (by operator control means not shown) to be supplied to the chambers 29 of the respective power cylinder devices 7. Since it is desirable to have all three latch mechanisms operate simultaneously, though they do not necessarily have to, the pressurized fluid supplied to the chambers 29 may be supplied through a common conduit having branch conduits connecting to the ports 30 of the respective power cylinder devices 7, as shown in FIG. 2. Moreover, since each of the power cylinder devices 7 and its associated latching mechanism function in a manner identical to the others, the detailed operation thereof will hereinafter be discussed in connection with just one, it being understood that such discussion will apply to all said devices.

With pressurized fluid in chamber 29 sufficient for overcoming the opposing force of spring 31, piston 28 is moved radially inwardly from a normal position, in which it rests against the end wall of the casing, to a latching-operating position in which it is shown in the drawing (FIG. 3) and defined by abutment of an annular stop 32 formed on said piston with an annular stop 33 formed on an annular spring seat 34 fixed in said housing and on which spring 31 seats. As piston 28 moves toward its latching-operating position, the connecting rod 26 is moved along therewith and thereby causes the bell crank 23 to be pivoted in a counterclockwise direction, as viewed in the drawing, about pivot pin 24. Arm 22 of bell crank 24, in turn, moves the link 21 in a generally right-hand direction, as viewed in the drawing, to cause pull rod 13 to be moved in the same direction.

As pull rod 13 moves toward the right, the spring 19 moving with said pull rod acts to pull the latch member 6 along with it and at the same time maintain the pin 15 against the right-hand ends of the respective guide slots 16, whereby said pin acts as a pivot point about which the spring tends to rotate said latch member in a clockwise direction. As the latch member 6 is moved toward the right, the lower side thereof slides down over the left-hand edge, designated by the reference numeral 35, of the slot 18, and said latch member is pivoted about pin 15 in a clockwise direction until it assumes a vertical or latching position in abutment with the outer casing wall of the valve device 4, as shown in the receiving stud 3 designated B in FIG. 3. Further movement of pull rod 13 toward the right causes the tension on spring 19 to increase accordingly, and such movement continues until the left-hand end of slot 14 is resting solidly against the latch member 6 to thereby exert a force on the valve device 4 for maintaining it in position for testing, the lost motion between said pull rod and said latch member being permitted by guide slots 16. This force, created by the pressure of fluid in chamber 29 acting on piston 28, is maintained through pull rod 13, link 21, bell crank 23 and connecting rod 26 as long as sufficient fluid pressure acting on said piston is maintained in said chamber.

Upon completion of the testing procedure of the valve device 4, the operator releases the pressure of fluid in chamber 29 by the operator control means, whereupon spring 31 causes piston 28 to be restored to its normal position. As piston 28 moves upwardly, the linkage comprising the connecting rod 26, bell crank 23 and link 21, is moved in a direction reversely to that above described to cause the pull rod 13 to be moved in a left-hand direction. During initial movement of pull rod 13 toward the left, latch member 6 is maintained in abutting position against the valve device 4 by the tension of spring 19 unitl the lost motion provided by guide slots 16 is taken up when the right-hand ends of said slots engage pin 15, whereupon further movement to the left of pull rod 13 carries said latch member with it. When the lower side of latch member 6, however, comes in contact with edge 35 of slot 18, the remaining movement of pull rod 13 to the left causes said latch member to be pivoted about pin 15 in a counterclockwise direction until it rests completely within slot 14 in said pull rod in a retracted position, as seen in stud A, FIG. 3. When all latch members 6 are in their respective retracted positions, the valve device 4 may be removed from the receiving studs 3, and another one to be tested may be mounted thereon.

A modified form of latch member 36 is shown in FIG. 4 of the drawings. Similarly to latch member 6, the latch member 36 is provided with the pin 15 having its ends riding in respective guide slots 16. Instead of being pivoted by tension of a spring, however, such as spring 19 acts to pivot latch member 6, latch member 36 has a trip lug 37 which engages a trip bar 38 fixed across its path of travel on the stud 3.

As the pull rod 13 moves toward the right, lug 37 comes into contact with bar 38, whereupon continued movement of said pull rod toward the right causes the latch member 36 to be pivoted in a counterclockwise direction until it assumes a vertical or latching position, as shown in the lower illustration of FIG. 4, in abutting contact with the outer wall of the valve device being tested. As the pull rod 13 moves to the right, an inclined edge or surface 39 formed on one end of the latch member 36 has sliding contact with a lower edge 40 at the left-hand end of a slot or recess 41 formed in the pull rod 13 and in which the latch member is disposed, so that, as the lost motion between said latch member and said pull rod is taken up, said inclined surface slides on said edge 40 to cause the latch member to be pivoted about pin 15. Of course, the lost motion provided by guide slots 16 permits the end portion of pull rod 13 to come to rest solidly against the latch member 36 for maintaining said latch member in its latching position. During reverse movement toward the left hand of pull rod 13 and latch member 36, an inclined surface or edge 42 formed on said latch member oppositely to lug 37, comes in contact with trip bar 38 to cause said latch member to be pivoted in a clockwise direction until it rests completely within the recess 41 in a retracted position in the pull rod 13. With latch member 36 in its retracted position, the device already tested may be removed, and another device to be tested may be placed on the apparatus.

Having now described the invention, what I claim as new and desire to secure by Letters Patent, is:

1. Power-operated clamping apparatus for clamping a ported valve device to be tested in sealed relation to a correspondingly ported test bracket on which said valve is mounted, said clamping apparatus comprising a member having a clamping face on which a valve device may be mounted, a plurality of valve mounting studs projecting in spaced relation from the clamping face of said member for extension through corresponding securing bolt passages in the valve device, said studs being tubular in form, reciprocable rods in each of said studs, latch means carried by each said rod and cooperable with the stud as the rod shifts in opposite directions in the stud to project out of said stud or to withdraw within the stud, and power means for shifting said rods simultaneously in a direction to first cause the several latch means to project from the respective studs and then engage the valve device to transmit to the valve device a clamping force exerted by the power means.

2. A clamping apparatus for securing a device to be tested to a test rack, said clamping apparatus comprising the combination of a housing securable to the test rack, a plurality of tubular receiving studs each having one end fixed to said housing for supporting the device to be tested, respective rods coaxially operable within said tubular receiving studs, respective latch members pivotally mounted at the respective ends of said rods adjacent the respective free ends of said receiving studs, each of said latch members being operable by the respective rod associated therewith to a retracted position within the circumferential limits of the respective tubular receiving stud, when said respective rod is moved axially in one direction, and being pivotally operable by axial movement of the rod in a direction opposite to said one direction, to a latching position in perpendicular relation to the axis of the receiving stud and in which the extremities of said latching member extend beyond said circumferential limits of the receiving stud, through oppositely disposed access slots formed in the respective stud, to permit abutting engagement of said latch member with the body of the device to be tested, and a plurality of fluid pressure operable cylinder devices responsive to fluid pressure for effecting axial movement of said rods, respectively, in said direction opposite to said one direction, said cylinder devices being effective when relieved of fluid pressure for causing said rods, respectively, to be axially moved in said one direction.

3. The combination, as defined in claim 2, further characterized in that, during axial movement of the respective rods in said opposite direction, each latch member is sequentially caused, first, to be pivoted to a position in which the extremities thereof project outside the limits of the respective receiving stud; secondly, to make said abutting engagement with the valve device and; thirdly, to transmit to the valve device a clamping force from and exerted by the respective fluid pressure operable cylinder device.

4. The combination, as defined in claim 2, further characterized by conduit means fluid under pressure may be supplied to and relieved from said fluid pressure operable cylinder devices simultaneously.

5. A clamping apparatus, as defined in claim 2, further characterized in that each of said latch members is provided with a transverse pin having its opposite ends slidably movable in longitudinal slots formed on facing walls of a recess provided in the respective pull rod, so as to register with the access slots formed in the receiving stud, and into which recess said latch member is retracted when in its retracted position, said longitudinal slots being formed parallel to the axial direction of movement of the pull rod and thereby providing limited lost motion between said pull rod and the latch member during axial movement of the pull rod, said apparatus being further characterized by respective springs associated with each of said latch members, each spring having one end fastened to the respective pull rod and the other end fastened to the adjacent side of the respective latch member at a point radially removed from the axis of said transverse pin, whereby, upon axial movement of the respective pull rod in its said opposite direction, the respective spring causes a pivoting moment to be exerted on the respective latch member to effect pivoting movement thereof to its latching position, and upon axial movement of the pull rod in its said one direction, one end of the latch member engages the adjacent end of one of said access slots formed in the respective tubular stud to thereby provide a fulcrum point about which the latch member is tripped and pivoted to its retracted position within said recess.

6. The combination, as defined in claim 2, in which each of the fluid pressure operable cylinder devices comprises a piston subjectable on one side to pressurized fluid in a chamber and operable in response to such pressure to a latch-operating position, in which axial movement of the respective pull rod in its said opposite direction is effected, a spring for exerting a biasing force on said piston in opposition to said fluid pressure, said spring being effective, upon release of fluid pressure from said chamber, for operating said piston to a normal position in which axial movement of the pull rod in its said one direction is effected, a bell crank lever having two arms, a connecting rod for operatively connecting one arm of said bell crank lever to said piston, and a floating link connecting the other arm of said bell crank lever to said pull rod, whereby motion from said piston is transmitted to said pull rod for effecting movement thereof accordingly.

7. The combination defined in claim 2, further characterized in that each latch member has formed thereon a trip lug and a first edge angularly inclined relative to the axis of travel of the pull rod, and each receiving stud is provided with a trip bar extending across one of the access slots and engageable by said trip lug, upon movement of the respective pull rod in its said opposite direction, while said first inclined edge is engageable by a vertical edge formed on the pull rod, whereby said trip lug, trip bar and first inclined edge cooperate to effect pivotal movement of the latch member to its latching position, said latch member having formed thereon a second inclined edge engageable with said trip bar, upon movement of the pull rod in its said one direction, to effect pivotal movement of the latch member to its retracted position.

References Cited in the file of this patent

UNITED STATES PATENTS

| | | |
|---|---|---|
| 1,787,509 | Campbell | Jan. 6, 1931 |
| 1,997,749 | Safford | Apr. 16, 1935 |
| 2,032,121 | Farmer | Feb. 25, 1936 |
| 2,408,560 | Keehn | Oct. 1, 1946 |
| 2,470,498 | Lankford | May 17, 1949 |